United States Patent
Halle

(10) Patent No.: US 11,261,808 B2
(45) Date of Patent: Mar. 1, 2022

(54) INTERNAL COMBUSTION ENGINE SYSTEM, COMPRISING AN INTERNAL COMBUSTION ENGINE AND AN EXHAUST GAS RECIRCULATION CIRCUIT

(71) Applicant: VOLVO TRUCK CORPORATION, Gothenburg (SE)

(72) Inventor: Adrien Halle, Lyons (FR)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 16/772,900

(22) PCT Filed: Dec. 15, 2017

(86) PCT No.: PCT/IB2017/001710
§ 371 (c)(1),
(2) Date: Jun. 15, 2020

(87) PCT Pub. No.: WO2019/116065
PCT Pub. Date: Jun. 20, 2019

(65) Prior Publication Data
US 2020/0309048 A1    Oct. 1, 2020

(51) Int. Cl.
*F02D 41/00* (2006.01)
*F02M 26/05* (2016.01)
(Continued)

(52) U.S. Cl.
CPC ....... *F02D 41/0007* (2013.01); *F02D 41/005* (2013.01); *F02D 41/0072* (2013.01);
(Continued)

(58) Field of Classification Search
CPC ............... F02D 41/0007; F02D 41/005; F02D 41/0072; F02D 2041/0067; F02M 26/05;
(Continued)

(56) References Cited

U.S. PATENT DOCUMENTS 5,937,834 A * 8/1999 Oto .................. F02M 26/05
60/605.2
7,080,506 B2 * 7/2006 Fukuzumi .............. F02M 26/30
60/278
(Continued)

FOREIGN PATENT DOCUMENTS

CN          104653352 A    5/2015
DE     102013209015 A1   11/2014
(Continued)

OTHER PUBLICATIONS

An English machine transaltion to Hennequin Manuela et al. (Pub. Number FR 3 014 951 A1), published on Jun. 19, 2015.*
(Continued)

*Primary Examiner* — Jesse S Bogue
(74) *Attorney, Agent, or Firm* — Venable LLP; Jeffri A. Kaminski

(57) ABSTRACT

An internal combustion engine system including an internal combustion engine and an exhaust gas recirculation circuit connecting an exhaust manifold of the engine to an intake manifold of the engine, the circuit including at least one reed valve, an EGR valve, that is arranged downstream of the reed valve on the path of exhaust gas flowing from the exhaust manifold to the intake manifold and an EGR line connecting the reed valve to the EGR valve. The system further includes a bypass line for gas, connecting the EGR line to an exhaust line of the engine and controller for controlling the flow of gas discharged through the bypass line.

14 Claims, 3 Drawing Sheets

(51) Int. Cl.
- *F02M 26/14* (2016.01)
- *F02M 26/39* (2016.01)
- *F02M 26/40* (2016.01)
- *F02M 26/70* (2016.01)
- *F02M 26/21* (2016.01)
- *F02M 26/25* (2016.01)
- *F02M 26/71* (2016.01)

(52) U.S. Cl.
CPC ............ *F02M 26/05* (2016.02); *F02M 26/14* (2016.02); *F02M 26/39* (2016.02); *F02M 26/40* (2016.02); *F02M 26/70* (2016.02); *F02D 2041/0067* (2013.01); *F02M 26/21* (2016.02); *F02M 26/25* (2016.02); *F02M 26/71* (2016.02)

(58) Field of Classification Search
CPC ........ F02M 26/14; F02M 26/39; F02M 26/40; F02M 26/70; F02M 26/21; F02M 26/25; F02M 26/71
USPC ........ 60/605.2; 701/108; 123/568.12, 568.18
See application file for complete search history.

(56) References Cited

U.S. PATENT DOCUMENTS

| | | | | |
|---|---|---|---|---|
| 7,243,495 B2* | 7/2007 | Whelan | ................. | F02M 26/71 60/605.2 |
| 7,281,529 B2* | 10/2007 | Lew | ................. | F02M 26/71 60/605.2 |
| 8,176,737 B2* | 5/2012 | Pierpont | ................. | F02M 26/43 60/605.2 |
| 8,307,647 B2* | 11/2012 | Le Flem | ................. | F02M 26/05 60/605.2 |
| 8,763,394 B2* | 7/2014 | Freund | ................. | F02M 26/05 60/605.2 |
| 8,943,823 B2* | 2/2015 | Fiveland | ................. | F02D 29/06 60/605.2 |
| 2013/0074494 A1 | 3/2013 | Chi et al. | | |

FOREIGN PATENT DOCUMENTS

| | | |
|---|---|---|
| EP | 1405995 A1 | 4/2004 |
| FR | 3014951 A1 | 6/2015 |
| WO | 2009081226 A1 | 7/2009 |
| WO | 2015092180 A3 | 9/2015 |
| WO | 2016207112 A1 | 12/2016 |

OTHER PUBLICATIONS

International Search Report and Written Opinion dated Feb. 12, 2019 in corresponding International PCT Application No. PCT/IB2017/001710, 10 pages.

China Office Action dated Dec. 3, 2021 in corresponding China Patent Application No. 201780097728.2, 12 pages.

* cited by examiner

INTERNAL COMBUSTION ENGINE SYSTEM, COMPRISING AN INTERNAL COMBUSTION ENGINE AND AN EXHAUST GAS RECIRCULATION CIRCUIT

CROSS-REFERENCE TO RELATED APPLICATIONS

This application is a U.S. National Stage application of PCT/IB2017/001710, filed Dec. 15, 2017, and published on Jun. 20, 2019, as WO 2019/116065 A1, all of which is hereby incorporated by reference in its entirety.

TECHNICAL FIELD

The invention relates to an internal combustion engine system, comprising an internal combustion engine and an exhaust gas recirculation circuit.

BACKGROUND

In the automotive industry, it is known that an internal combustion engine is efficient when the combustion temperature in the engine cylinders is high. However, when peak temperatures remain high for a long period of time, nitrogen and oxygen in the air combine to form new compounds, primarily NO and NO2, which are referred to as "NOx". NOx emissions then depend on the combustion temperature in the engine cylinders.

With this respect, most modern engines require Exhaust Gas Recirculation to meet NOx emissions standards. An example of an EGR circuit is known from WO 2009/081226 A1. EGR consists in recirculating a portion of the exhaust gases back to the engine cylinders inlet to reduce local combustion temperatures. This arises from the fact that the residual charge (exhaust gas), which mainly includes nitrogen, carbon dioxide, oxygen and water vapor, has a specific heat that is higher to that of the fresh charge (air) and also from the fact that the $O_2$ content at the engine intake is reduced because the proportion of fresh air is less important.

In order to introduce EGR into intake manifold, EGR pressure must be greater than intake manifold pressure. With this respect, it is known to use a Variable Geometry Turbine (VGT) or a reed valve in the EGR line or an asymmetric Fixed Geometry Turbo (FGT) or an Inlet Throttle Valve (ITV) to increase the pressure of the exhaust gases admitted in the intake manifold.

The use of at least one reed valve is advantageous in that it is probably the cheaper solution. The reed valve is a one-way valve that enables exhaust gases to flow in the direction of the intake manifold. The reed valve (or check valve) prevents back flow in the EGR line, that is to say to prevent incoming fresh air from entering the exhaust manifold via the EGR line in case the intake manifold pressure is greater than the exhaust manifold pressure. In addition, an EGR valve is provided to control the quantity of exhaust gases admitted in the intake manifold.

Traditionally, the EGR valve is arranged upstream of the reed valve on the flow path of exhaust gases between the exhaust manifold and the intake manifold. In particular, the EGR valve is located upstream of a cooler, i.e. on the hot side. However, this arrangement does not help increasing the pressure of the exhaust gases admitted in the intake manifold.

With this respect, in WO 2009/081226 A1, the EGR valve is arranged downstream of the reed valve, meaning that the pipe portion between the reed valve and the EGR valve forms some kind of accumulator, wherein the pressure can increase due to the accumulation of exhaust gases. As a matter of fact, one observes pressure peaks during the exhaust stroke of the internal combustion engine. Such pressure peaks lead to pressure waves propagating intermittently through the reed valve. Between two pressure peaks, the pressure in the exhaust manifold drops. The reed valve enables protecting the EGR circuit from this pressure drop.

The EGR functionality is not always activated. Typically, when the engine is cold or when a high motor torque is requested, there is no EGR. Accordingly, the pressure downstream of the reed valve can increase to a high pressure level, close to peak pressure of the cylinders. This may lead to a mechanical failure as the reed valves are not designed to withstand above a predetermined pressure difference.

It is an object of the present invention to provide an improved internal combustion engine system, which can overcome the drawbacks of the prior art systems.

SUMMARY

To this end, this invention concerns an internal combustion engine system.

Thanks to the invention and due to the fact that the bypass line connects the EGR line to an exhaust line of the engine at a point of connection of the EGR line that is located downstream of the reed valve and upstream of the EGR valve, the bypass line can divert EGR flow directly to the exhaust line to control the EGR pressure in the EGR line extending between the reed valve and the EGR valve. Typically, the EGR pressure in said EGR line is maintained above that of the intake manifold (fresh air), in order not to inhibit the recirculation, and below a certain threshold to prevent any mechanical failure of the reed valves.

WO 2016/207112 A1 discloses the idea of having a bypass line connecting the exhaust gas recirculation line at a position downstream from the EGR valve to the exhaust line at a position downstream from the turbine unit. A discharge valve is provided for controlling the flow of gas discharged from the EGR circuit to the exhaust line. The discharged valve is, for instance, controlled in an open position to by-pass the turbine of the turbocharger in order to increase the temperature of the exhaust gas upstream the Exhaust After Treatment System (EATS).

BRIEF DESCRIPTION OF THE DRAWINGS

The invention will be better understood from reading the following description, given solely by way of two non-limiting examples and with reference to the appended drawings, which are schematic depictions, in which.

DETAILED DESCRIPTION OF EXAMPLE EMBODIMENT(S) OF THE INVENTION

Figure 1:
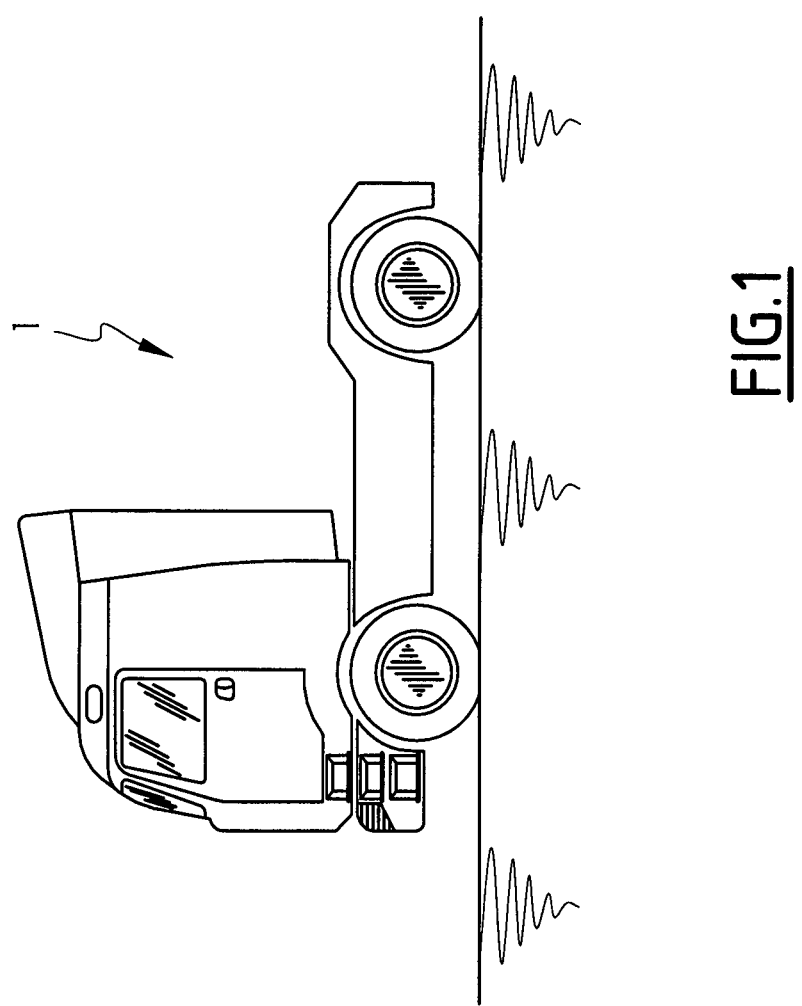
FIG. 1 is a side view of a heavy-duty vehicle, in particular a tractor truck.
Figure 2:
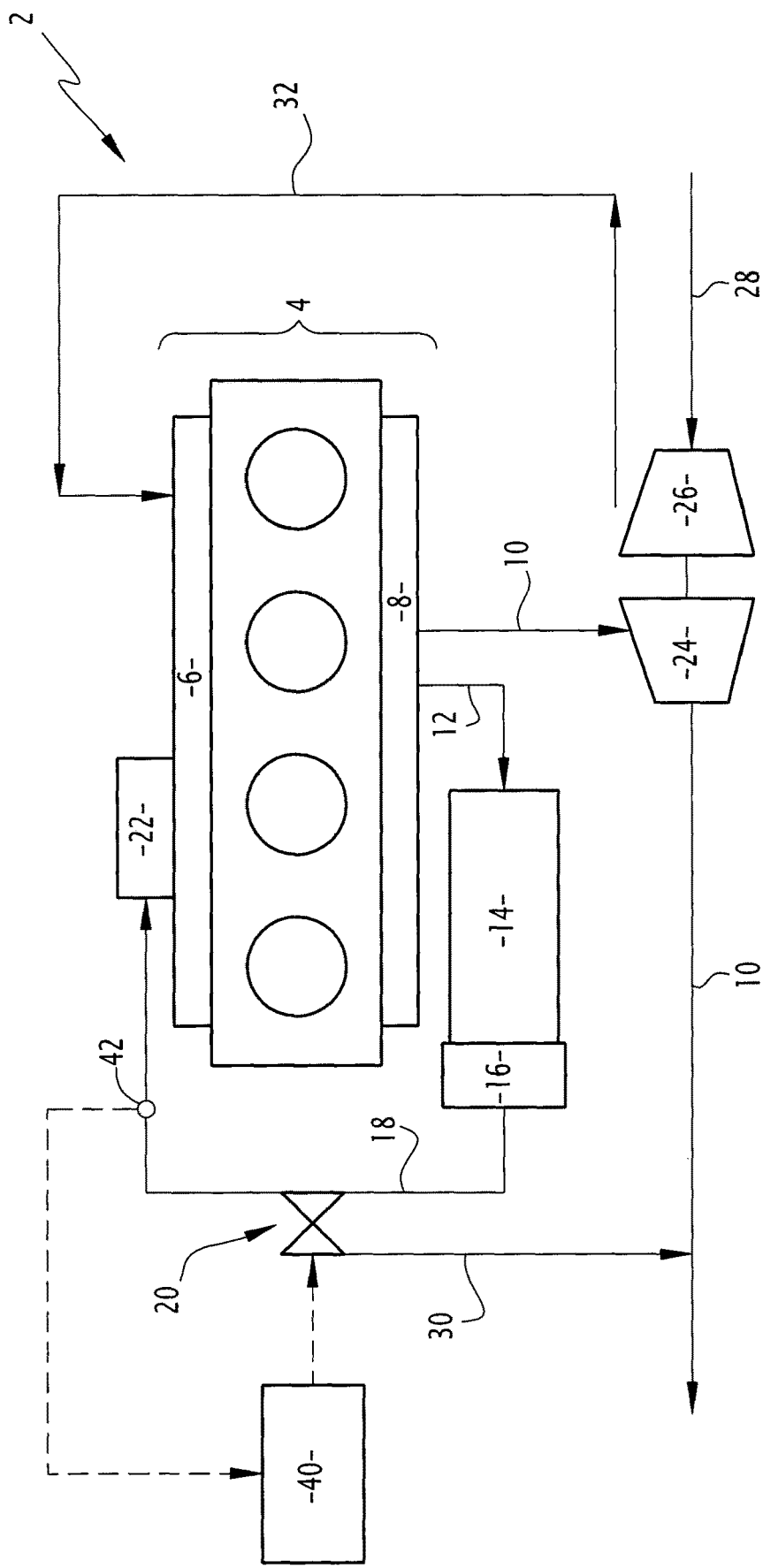
FIG. 2 is a schematic drawing of an internal combustion engine system according to the invention, belonging to the vehicle of FIG. 1.

FIG. 1 represents, in side view, a vehicle which is, in the example, a tractor truck 1. However, in a non-represented alternative embodiment, the vehicle may be different from a tractor truck. For instance, the vehicle may be a light, medium or heavy-duty vehicle, a utility vehicle, an autonomous vehicle, etc.

The tractor truck 1 includes an internal combustion engine system 2 comprising an Internal Combustion Engine (ICE) 4, preferably a diesel engine, and an Exhaust Gas Recirculation circuit (or EGR circuit) connecting an exhaust manifold 8 of the engine to an intake manifold 6 of the engine. Alternatively, the engine 4 may be a gasoline engine.

The EGR circuit includes at least one reed valve 16 and an EGR valve 22, that is arranged downstream of the reed valve 16 on the path of exhaust gas flowing from the exhaust manifold 8 to the intake manifold 6. The EGR circuit also includes an EGR line 18 connecting the reed valve 16 to the EGR valve 22.

The reed valve 16, which can also be referred to as a check valve, generally includes a pair of flexible metal blades having a certain stiffness. These flexible blades are sized to resist up to a certain pressure difference between both sides of the valve, meaning that a larger pressure difference may lead to a mechanical failure.

Preferably, the EGR circuit also includes a cooler 14 arranged upstream of the reed valve 16 on the path of exhaust gas flowing from the exhaust manifold 8 to the intake manifold 6. Typically, and as known per se, the cooler 14 is a heat exchanger, in particular a cross-flow heat exchanger. The cooler 14 enables increasing the density of the EGR, thus increasing the amount of admitted EGR in the engine. This also enables reducing the temperature of the mixture at the intake and, consequently, NOx generation. Numeral reference 12 denotes a pipe portion between the exhaust manifold 8 and the cooler 14.

According to the invention, the EGR circuit also includes a bypass line 30 connecting the EGR line 18 to an exhaust line 10 of the engine, and control means for controlling the flow of gas discharged through the bypass line 30. The exhaust line 10 is connected to the turbine 24 which is connected to the exhaust manifold 8 of the engine block 4. The function of the exhaust line 10 is to vent the exhaust gases from the turbine outlet to the atmosphere. In practice, the exhaust line 10 is preferably connected to an Exhaust After Treatment System (EATS), not represented on the figures, for the treatment of the gases prior to release into the environment.

In the example, the control means include a discharge valve 20. The discharge valve 20 is arranged on the bypass line 30. Typically, the discharge valve 20 is a two-way valve, meaning that the valve 20 includes an inlet connected to the EGR line 18 and an outlet connected to the exhaust line 10.

Alternatively, the discharge valve 20 may be a three-way valve, comprising an inlet connected to the reed valve 16 via a pipe portion, a first outlet connected to the EGR valve 22 via another pipe portion and a second outlet, or discharge outlet, which is connected to an exhaust line 10 of the engine. In this alternative embodiment, depending on the configuration of the valve, the gas flow entering in the inlet of the three-way valve is diverted to the first outlet and/or to the second outlet of the valve.

As the discharge valve 20 and the EGR valve 22 are arranged downstream of the EGR cooler 14, they are not subjected to high temperatures, meaning that basic cheap valves can be used.

Preferably, the discharge valve 20 is an electromechanically operated valve, e.g. a solenoid valve. Accordingly, the control means include a controller, such as a control box 40, that is provided for controlling the opening and closing of the valve 20. Typically, this control box 40 may be the same than the one controlling the opening and closing of the EGR valve 22. Alternatively, the discharge valve 20 may be an automatic valve that opens automatically when the pressure in the pipe 18 exceeds a predetermined threshold and that remains closed the rest of the time.

In the example, the control means also include a pressure sensor 42 for measuring the pressure in the line 18 connecting the reed valve 16 to the EGR valve 22 and transmitting means for transmitting the measured pressure to the controller 40. Typically, such transmitting means may be wired or wireless communication means.

In practice, the controller 40 is configured to open the discharge valve 20 when the pressure in the EGR line 18 connecting the reed valve 16 to the EGR valve 22 exceeds a predetermined threshold pressure value in order to protect the reed valve 16 against over pressure. When the valve 20 is in closed configuration, there is no flow of gas in the bypass line 30. However, when the valve 20 is in an opened configuration, the exhaust gas accumulated in EGR line 18 is discharged through the bypass line 30, leading to a pressure drop in line 18.

Advantageously, the discharge valve 20 may be controlled to remain in open configuration for a predetermined period of time or until the pressure in line 18 decreases down to a specific inferior pressure value that is superior to the pressure of air in the intake manifold 6, in order to not inhibit the exhaust gas recirculation towards the intake manifold 6.

Advantageously, the system 2 includes a turbocharger comprising an air compressor 26 and a turbine 24 for driving the compressor 26. The turbine 24 is arranged so that the exhaust gas in the exhaust line 10 flows through the turbine 24. One speaks of a turbocharged engine.

Preferably, the turbine 24 is a fixed geometry turbine. This provides the advantage of minimizing the exhaust gas back pressure, i.e. the pressure in the exhaust manifold 8 which, in turn, is beneficial for the fuel consumption. On top of that, fixed geometry turbochargers are cheaper than variable geometry turbochargers.

In practice, the compressor 26 compresses fresh air coming from an air intake 28 and provided the intake manifold 6 with compressed air. Numeral reference 32 denotes the air pipe extending between the compressor 26 and the intake manifold 6. In a non-represented alternative embodiment, a cooler may be provided between the compressor 26 and the intake manifold 6. Such cooler may help increasing the density of fresh air introduced in the intake manifold 6.

Advantageously, the bypass line 30 connects the EGR line 18 with the exhaust line 10 at a position downstream of the turbine 24 on the path of exhaust gas flowing in the exhaust line 10. In other words, the discharge outlet of the valve 20 opens downstream of the turbine 24 on the path of exhaust gas flowing in the exhaust line 10. Thanks to this arrangement, there is no need to equip the turbine 24 with a waste gate as the discharge valve 20 replaces the waste gate.

Indeed, traditionally, a waste gate is a small valve that is integrated in the turbine casing and that enables bypassing the turbine. One speaks of waste-gated turbochargers. When the waste gate is open, a portion of the gases bypass the turbine, i.e. does not flow through the stages of the turbine. This constitutes a turbine overspeed protection. In practice, the waste gate is opened when the temperature and/or the pressure of the gases upstream the turbine is above an acceptable level, i.e. when the temperature and/or the pressure of the gases upstream the turbine is such that it may lead to turbine overspeed and mechanical failure. Given that such waste gate is not necessary in the engine system according to the invention, the turbocharger can be very simple, and in particular cheaper than a waste-gated turbocharger.

According to the invention, EGR line 18 and bypass line 30 can be used to by-pass the turbine 24 when the temperature and/or the pressure of the gases upstream the turbine, for instance in the exhaust manifold 8, is/are above a predetermined threshold level. The discharge valve 20 can therefore be used in replacement of the waste gate of the turbine 24. Accordingly, a pressure sensor and/or a temperature sensor (not represented) may be provided to measure the pressure and/or the temperature in the exhaust manifold 8. When the pressure or the temperature in the exhaust manifold is too high, i.e. above what the turbine 24 can tolerate, the discharge valve 20 is opened to prevent turbine overspeed. Indeed, when the discharge valve 20 is open, the back pressure in the pipe 12 is inferior to that in the pipe 10, meaning that a larger portion of the exhaust gases flows in the EGR circuit. Accordingly, the portion of exhaust gas flowing through the turbine 24 is reduced.

Figure 3:
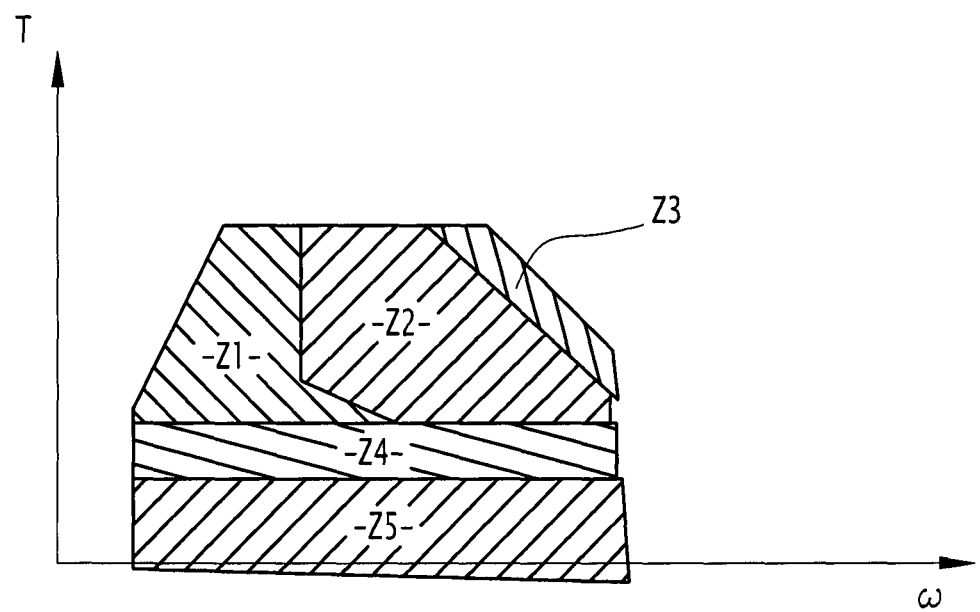
FIG. 3 is a graph plotting the engine torque as a function of engine speed and showing the different operating ranges of the internal combustion engine.

FIG. 3 represents the different operating ranges of an internal combustion engine, on a graph plotting the engine torque (T) as a function of the engine speed (w). For the explanations, P2 denotes the pressure in inlet manifold 6, commonly named "boost pressure", P3 denotes the pressure in exhaust manifold 8 and P4 denotes the pressure downstream of the turbine 24, which is close to atmospheric pressure.

In zones Z1, Z4 and Z5, average P3 is significantly lower than average P2. Though, pressure waves in exhaust manifold 8 can be used to drive a small portion of exhaust gases from exhaust manifold 8 to the inlet manifold 6, thanks to the reed valve 18 that prevents from backflow in the EGR line 12.

In zones Z2 and Z3, the average P3 is sufficient to drive exhaust gases from exhaust manifold 8 to the inlet manifold 6.

In zone Z3, the waste gate of the turbine 24 is normally used to divert gas flow out of the turbine in order to prevent from overspeed. When there is a need for increasing the temperature of the Exhaust After Treatment System (EATS), the waste gate can be opened also at low load conditions, in zone Z4.

In the following is described an advanced control method of the discharge valve 20 when the turbine 24 is free of waste gate.

During normal operation, the engine is hot and there is a need for EGR at all operating ranges. In zones Z1, Z4 and Z5, the discharge valve 20 is used to control EGR pressure downstream of the reed valve 16. The valve 20 should be controlled to bypass only a little amount of EGR flow so that a sufficient flowrate of exhaust gas flows through the turbine 24 to reach the necessary boost pressure P2. In zone Z2, the valve 20 is also used to control EGR pressure downstream the reed valve 16. The bypassed flow rate through the discharge valve 20 is larger than in zone Z1 since average P3 is higher than in zone Z1. However, since the average P3 is larger than the average P2, the turbocharger 26 should be able to provide enough boost pressure P2 even though the discharge valve 20 is bypassing exhaust gases to the turbine outlet. It is to be noted that the discharge valve 20 will preferably be opened only when no EGR is needed in these conditions, which should be rare. In zone Z3, the valve 20 is used to control the turbo speed, i.e. the speed of the turbine 24, as a usual waste gate does. Since the average P3 is significantly higher than the average P2, diverting gases to the exhaust line through the discharge valve 20 does not inhibit EGR, i.e. does not prevent exhaust gas from flowing to the inlet manifold 6.

However, when the engine is cold, there is a need to increase EATS temperature. The discharge valve 20 can be opened in zones Z4 and Z5 without affecting the EGR flow rate, since EGR is usually not wanted in these conditions. However, since some EGR will flow through the EGR cooler 14 with cold coolant, there is a high risk of clogging in the EGR cooler 14 and/or in the reed valve 16. Therefore, an EGR cooler bypass (not represented) could be added to the system, bypassing the cooler 14 only, or the cooler 14 plus the reed valve 16. In zone Z5, with such EGR cooler bypass, EGR can be used as a means to maintain the temperature of the EATS or increase it faster. In these running conditions, the discharge valve 20 can be opened when needed. When there is a need to increase EATS temperature, the discharge valve 20 is opened to by-pass at least the turbine 24. A first direct effect resulting from the by-pass of the turbine 24 is an increase of the temperature of gases flowing to the EATS. A second effect resulting from the by-pass of the turbine 24 is a limitation of the power available to drive the air compressor 26 that results in less fresh air compressed by the compressor and thus less fresh air received by the inlet manifold 6. A decrease of fresh air received by the inlet manifold 6 causes a decrease of the exhaust gas flowing through the EATS, which is favorable to maintain temperature in the EATS, especially when engine torque is low such as in zones Z4 and Z5.

In a non-represented alternative embodiment, the discharge outlet of the discharge valve 20 opens upstream of the turbine 24 on the path of exhaust gas flowing in the exhaust line 10. In this case, the turbine 24 is equipped with an integrated waste gate.

The features of the depicted embodiment and of non-represented alternative embodiments can be combined together to generate new embodiments of the invention.

The invention claimed is:

1. An internal combustion engine system, comprising an internal combustion engine and an exhaust gas recirculation circuit connecting an exhaust manifold of the engine to an intake manifold of the engine, the exhaust gas recirculation circuit comprising:
   at least one reed valve;
   an EGR valve arranged downstream of the reed valve on a path of exhaust gas flowing from the exhaust manifold to the intake manifold;
   an EGR line connecting an outlet of the reed valve to an inlet of the EGR valve, wherein the system further includes:
   a bypass line for gas, connecting the EGR line to an exhaust line of the engine; and
   a controller for controlling the flow of gas discharged through the bypass line via controlling an opening position of a discharge valve positioned in the bypass line.

2. The system according to claim 1, wherein the discharge valve is a two-way valve.

3. The system according to claim 1, further including:
   a pressure sensor for measuring a pressure in the EGR line; and
   a transmitter for transmitting the measured pressure to the controller.

4. The system according to claim 1, wherein the controller is configured to open the discharge valve when the pressure in the EGR line exceeds a predetermined threshold.

5. The system according to claim 4, wherein the controller is configured to maintain the discharge valve in the opening position for a predetermined period of time or until the pressure in the EGR line decreases down to a specific pressure value that is superior to a pressure of air in the intake manifold.

6. The system according to claim 1, wherein the discharge valve is an electromechanically operated valve.

7. The system according to claim 1, wherein the system further includes a turbocharger comprising an air compressor and a turbine for driving said compressor, the turbine being arranged so that the exhaust gas in the exhaust line flows through the turbine.

8. The system according to claim 7, wherein the bypass line connects to the exhaust line at a position downstream of the turbine on the path of exhaust gas flowing in the exhaust line.

9. The system according to claim 7, wherein the turbine is without waste gate.

10. The system according to claim 7, wherein the turbine is a fixed geometry turbine.

11. The system according to claim 1, wherein the exhaust gas recirculation circuit also includes a cooler.

12. The system according to claim 11, wherein the cooler is arranged upstream of the reed valve on the path of exhaust gas flowing from the exhaust manifold to the intake manifold.

13. The system according to claim 11, wherein the exhaust gas recirculation circuit includes a bypass of at least one of the cooler and the reed valve.

14. A vehicle comprising an internal combustion engine system comprising an internal combustion engine and an exhaust gas recirculation circuit connecting an exhaust manifold of the engine to an intake manifold of the engine, the exhaust gas recirculation circuit comprising:
at least one reed valve;
an EGR valve, that is arranged downstream of the reed valve on the path of exhaust gas flowing from the exhaust manifold to the intake manifold;
an EGR line connecting an outlet of the reed valve to an inlet of the EGR valve, wherein the system further includes:
a bypass line for gas, connecting the EGR line to an exhaust line of the engine; and
controller for controlling the flow of gas discharged through the bypass line via controlling an opening position of a discharge valve positioned in the bypass line.

* * * * *